Nov. 24, 1953   G. D. HAYDEN   2,660,075
EXPANSIBLE DRILL
Filed Dec. 11, 1950
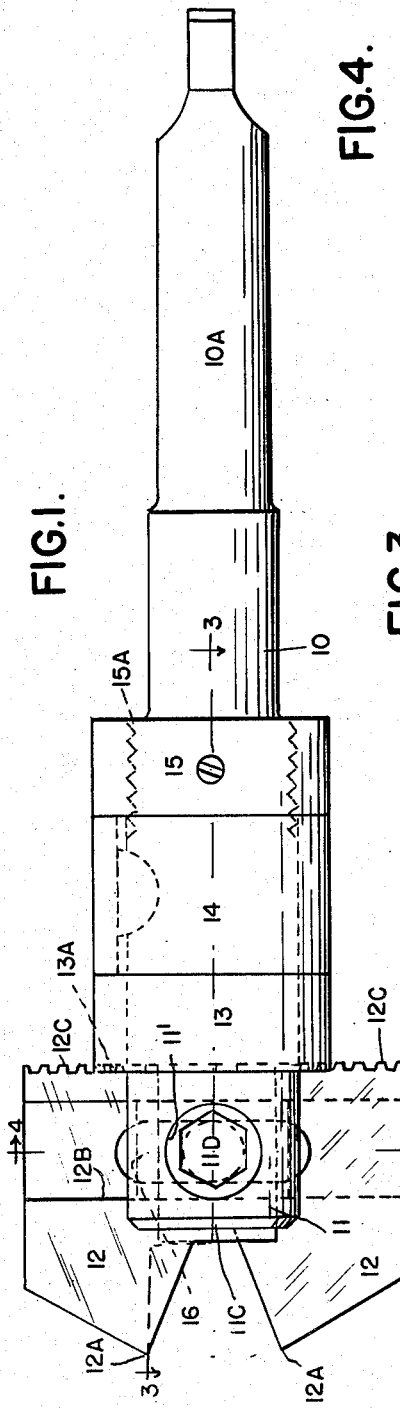
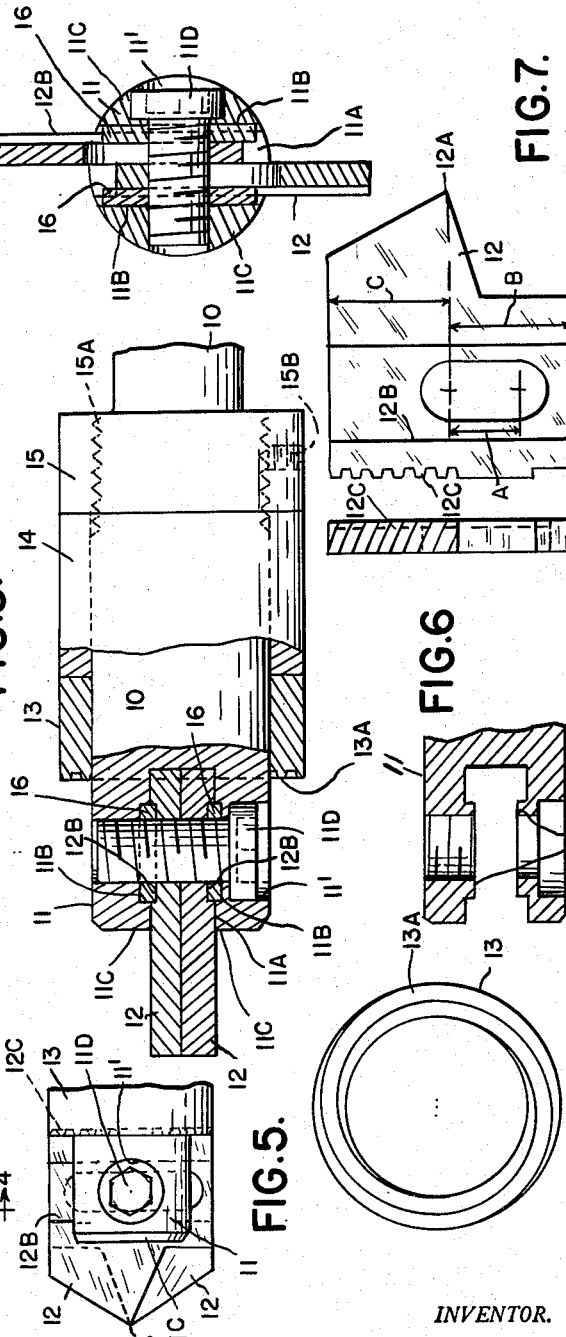
INVENTOR.
GEORGE D. HAYDEN
BY
ATTORNEYS Patented Nov. 24, 1953

2,660,075

UNITED STATES PATENT OFFICE 2,660,075

EXPANSIBLE DRILL

George D. Hayden, Detroit, Mich., assignor to Hayden Twist Drill Company, Detroit, Mich., a corporation of Michigan Application December 11, 1950, Serial No. 200,281

1 Claim. (Cl. 77—67)

The present invention relates to expansible or adjustable drills and has among its objects the provision of a drill capable of drilling into solid metal and of greatly enlarging such a hole by a simple adjustment.

Another object of the invention is a drill of the type indicated which shall be simple in construction and operation and which shall consist of only a few parts.

Still other objects and advantages will be apparent to those skilled in the art upon reference to the following description and the accompanying drawings in which Fig. 1 is a side view in elevation of the drill as adjusted for an increased size of hole.

Fig. 2 shows a similar view of the drill point as adjusted for drilling in a solid.

Fig. 3 is a section on line 3—3 of Fig. 1.

Fig. 4 is a section on line 4—4 of Fig. 1.

Fig. 5 is a top plan of the adjusting ring.

Fig. 6 is a bottom plan of one of the bits or blades.

Fig. 7 is a side elevation of the same.

Fig. 8 is a sectional view showing a modified structure.

As indicated in the drawing, the drill consists of a body 10 provided with a shank 10A suitable for insertion into a suitable chuck and a somewhat enlarged cylindrical portion at the opposite end terminating in blade holding portion 11. This blade holding portion is provided with a pair of jaws 11C produced by cutting a deep diametrical slot 11A, the side walls of which are accurately parallel and each provided with a shallow rectangular groove 11B extending across the axis of the body. Further, a suitable passage is drilled diametrically through the jaws and countersunk as at 11C to receive a suitable screw 11D, this being threaded into the wall opposite the countersink.

In the slot 11A are mounted a pair of blades or drill points 12 which are identical but arranged as "right" and "left." These blades are of the form shown in Fig. 7, being each provided with a cutting point 12A, and a groove 12B of the same size as groove 11B and located so as to register with the latter when the blade is in place in the jaws 11C. The blades 12 are also provided on the bottom edges, that is, the edge opposite the point 12A, with a series of spirally curved teeth 12C, and with a slotted opening 12D.

Carried by the body 10 is a ring 13 of substantial thickness having formed on one of its edges a double scroll or spiral groove 13A adapted to mesh with the teeth 12C on the blades 12. Also carried by the body 10 is a second ring 14, this acting as a backing ring and bearing for ring 13.

A third ring 15 is also carried by the body and threaded thereon as indicated at 15A and provided with a set screw 15B.

As indicated in Figs. 1 to 4, the two blades are mounted in the jaws 11C being placed "right" and "left" with plates 16 in the grooves 11B and 12B and serving as guides. The plates 16 are provided with openings fitting the screws 11D.

The ring 13 meshing with teeth 12C serves to fix and adjust the position of the blades and the ring 15 serves to maintain the parts in adjusted position.

When the blades 12 are in the position shown in Fig. 2, the drill may be used to drill in solid metal. The hole produced may then be enlarged up to the widest adjustment of the blades 12 by loosing screw 11D and ring 15, turning ring 13 to move the blades, and tightening again the parts.

In Fig. 8 the jaws 11 are shown as provided with suitable slides D taking the place of the separate members 16.

In the above description, the blades are described as "right" and "left." This refers only to the operation of assembling. Further, in order to provide for proper operation at the limits of the adjustment, the drill point or blades must be so formed that the point 12A is in line with the center of the inner end of the slot and that distance B be slightly less than the distance C.

By making the ring 13 with a double scroll as mentioned, the blades 12 may be made identical and interchangeable. It is obvious that several sets of blades may be used in a single body to increase the range of sizes of holes, and this is contemplated.

I claim:

An adjustable drill capable of drilling in solid material said drill comprising a body having at one end a shank and at its other end a pair of jaws, a pair of blades in said jaws, each having a drilling point and inclined cutting edge, said blades arranged in said jaws in overlapping parallel planes and being identical but arranged as "right" and "left," means for adjusting the positions of said blades simultaneously and equally, whereby to bring said points together to provide in effect a single point or to separate said points and cutting edges, said blades being of sufficient width so that a substantial overlap is maintained in all adjusted positions, means for fixing said blades in adjusted position, and guide means for said blades, during adjustment, said guide means receiving the end thrust on said blades during a drilling operation.

GEORGE D. HAYDEN.

References Cited in the file of this patent

UNITED STATES PATENTS

| Number | Name | Date |
|---|---|---|
| 457,536 | Jennings | Aug. 11, 1891 |
| 613,660 | Brunner | Nov. 8, 1898 |
| 1,446,662 | Samuel | Feb. 27, 1923 |

FOREIGN PATENTS

| Number | Country | Date |
|---|---|---|
| 551,148 | Great Britain | Feb. 9, 1943 |